Patented July 19, 1932

1,867,793

UNITED STATES PATENT OFFICE

HANS-GEORG ALLARDT, OF BERLIN-REINICKENDORF-WEST, GERMANY, ASSIGNOR TO SCHERING-KAHLBAUM A. G., OF BERLIN, GERMANY

METHOD OF PRODUCING ALKALI SALTS OF IODOMETHYL SULPHONIC ACID

No Drawing. Application filed May 28, 1931, Serial No. 540,626, and in Austria June 12, 1930.

My invention refers to the production of therapeutically valuable substances and more particularly to methods of producing alkali salts of iodomethyl sulphonic acid. It is an object of my invention to render such methods more efficient and to obtain higher yields than was heretofore possible.

According to my invention I obtain alkali salts of iodomethyl sulphonic acid by heating iodoform with the corresponding alkali salt of sulfurous acid and extracting the resulting product from the reaction mixture. The reaction proceeds in accordance with equations of the type:

$$CHI_3 + 2Na_2SO_3 + H_2O = CH_2ISO_3Na + 2NaI + NaHSO_4$$

and may be promoted by the presence of finely divided copper such as for instance of copper powder. The mixture is preferably heated in the presence of a diluent or solvent and, if desired, under a pressure above atmospheric pressure.

In the practice of my invention I may proceed for instance as follows:

1 mol. iodoform and at least 2 mols. crystallized sodium sulfite are mixed with an adequate quality of water containing some ethyl alcohol and with some finely powdered metallic copper. The mixture is then heated for about 20 hours under a reflux condenser, or for 10 hours in an autoclave made of copper, to about 120-140° C. After this treatment all the iodoform is found to be dissolved and no sulfite to be present if not more than 2 mols. have been added per mol. iodoform. I thereafter neutralize with an alkali hydroxide or carbonate and evaporate to dryness, whereupon I remove the sodium iodide contained in the residue by extracting it with acetone. The sodium salt of iodomethyl sulphonic acid may then be recovered by recrystallizing the residue from ethyl alcohol. The sodium salt of iodomethyl sulphonic acid thus obtained crystallizes in the form of white needles or scales; it is readily soluble in water, little soluble in cold ethyl alcohol, hardly soluble in hot acetone and insoluble in ethyl ether and petrol ether. The crystals contain 1 mol. crystal water which, however, evaporates already at temperatures below 100° C. When dried at 100° C. the sodium salt contains 51.7-52% iodine.

It will be understood that in a similar manner also other alkali salts of iodomethyl sulphonic acid, such as for instance the lithium salt or the potassium salt can be obtained, provided that the sodium sulfite be replaced by the equivalent quantity of lithium or potassium sulfite.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The method of producing alkali salts of iodomethyl sulphonic acid comprising heating a mixture of iodoform and an alkali sulfite and recovering the alkali salt of iodomethyl sulphonic acid formed in the reaction.

2. The method of producing alkali salts of iodomethyl sulphonic acid comprising heating a mixture of iodoform and alkali sulfite in the presence of copper powder and recovering the alkali salt of iodomethyl sulphonic acid formed in the reaction.

3. The method of producing alkali salts of iodomethyl sulphonic acid comprising heating a mixture of iodoform and alkali sulfite in the presence of copper powder and of an inert diluent and recovering the alkali salt of iodomethyl sulphonic acid formed in the reaction.

4. The method of producing alkali salts of iodomethyl sulphonic acid comprising heating a mixture of iodoform and alkali sulfite under a pressure above atmospheric pressure and recovering the alkali salt of iodomethyl sulphonic acid formed in the reaction.

5. The method of producing alkali salts of iodomethyl sulphonic acid comprising heating a mixture of iodoform and alkali sulfite in the presence of copper powder under a pressure above the atmospheric pressure and recovering the alkali salt of iodomethyl sulphonic acid formed in the reaction.

6. The method of producing alkali salts of iodomethyl sulphonic acid comprising heating a mixture of iodoform and alkali sulfite in the presence of copper powder and of an inert diluent under a pressure above the atmospheric pressure and recovering the alkali salt of iodomethyl sulphonic acid formed in the reaction.

7. The method of producing the sodium salt of iodomethyl sulphonic acid comprising heating a mixture of 1 mol. iodoform, at least 2 mols. sodium sulfite and an aqueous solution of ethyl alcohol in the presence of copper powder and recovering the sodium salt of iodomethyl sulphonic acid formed in the reaction.

In testimony whereof I affix my signature.

HANS-GEORG ALLARDT.